United States Patent
Alt et al.

(10) Patent No.: US 11,714,739 B2
(45) Date of Patent: Aug. 1, 2023

(54) JOB PERFORMANCE BREAKDOWN

(71) Applicant: Advanced Micro Devices, Inc., Santa Clara, CA (US)

(72) Inventors: Max Alt, San Francisco, CA (US); Gabriel Martin, Extremadura (ES); Paulo Roberto Pereira de Souza filho, Maringa (BR)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/404,401

(22) Filed: Aug. 17, 2021

(65) Prior Publication Data

US 2022/0050762 A1     Feb. 17, 2022

Related U.S. Application Data

(60) Provisional application No. 63/066,429, filed on Aug. 17, 2020.

(51) Int. Cl.
    *G06F 11/34*          (2006.01)
    *G06N 3/088*        (2023.01)

(52) U.S. Cl.
    CPC ...... *G06F 11/3428* (2013.01); *G06F 11/3495* (2013.01); *G06N 3/088* (2013.01)

(58) Field of Classification Search
    CPC .. G06F 11/302; G06F 11/3082; G06F 11/324; G06F 11/3428; G06F 11/3452; G06F 11/3476; G06F 11/3495; G06F 2201/815; G06F 2201/865; G06F 2201/88; G06N 3/088; G06N 20/00

USPC ........................................................ 702/186
See application file for complete search history.

(56) References Cited

U.S. PATENT DOCUMENTS

| | | | |
|---|---|---|---|
| 8,296,419 B1 | 10/2012 | Khanna et al. | |
| 10,548,034 B2* | 1/2020 | Ganapathi | H04L 43/022 |
| 10,817,401 B1 | 10/2020 | Lewis | |
| 2003/0114986 A1* | 6/2003 | Padmanabhan | G16Z 99/00 |
| | | | 702/19 |
| 2012/0226788 A1 | 9/2012 | Jackson | |
| 2016/0019636 A1 | 1/2016 | Adapalli et al. | |
| 2016/0098334 A1 | 4/2016 | Hariharakrishnan et al. | |
| 2016/0224898 A1 | 8/2016 | Ryckbosch et al. | |
| 2017/0249192 A1 | 8/2017 | Thompson | |
| 2017/0373940 A1 | 12/2017 | Shahab et al. | |
| 2018/0365576 A1 | 12/2018 | Guttmann et al. | |

(Continued)

OTHER PUBLICATIONS

International Search Report and Written Opinion for International Patent Application No. PCT/US21/42439.

*Primary Examiner* — John H Le
(74) *Attorney, Agent, or Firm* — Fishman Stewart PLLC (57) ABSTRACT

A system and method for processing application performance using application phase differentiation and detection is disclosed. Phase detection may be accomplished in a number of different ways, including by using a deterministic algorithm that looks for changes in the computing resource utilization patterns (as detected in the performance data collected). Machine learning (ML) and neural networks (e.g. sparse auto encoder SAE) may also be used. Performance data is aggregated according to phase and stored in a database along with additional application and computing system information. This database may then be used to find similar applications for performance prediction.

22 Claims, 8 Drawing Sheets

(56) References Cited

U.S. PATENT DOCUMENTS

2019/0171483 A1    6/2019  Santhar et al.
2019/0208009 A1    7/2019  Prabhakaran et al.

* cited by examiner

| | CYCLES | PAGE FAULTS | CONTEXT SWITCHES | INSTRUCTION COUNTER |
|---|---|---|---|---|
| BENCHMARK A | | | | |
| BENCHMARK B | | | | |
| BENCHMARK N | | | | |

JOB PERFORMANCE BREAKDOWN

CROSS-REFERENCE TO RELATED APPLICATIONS

This application claims the benefit of, and priority to, U.S. Provisional Application Ser. No. 63/066,429, filed Aug. 17, 2020, the disclosure of which is hereby incorporated herein by reference in its entirety and for all purposes.

TECHNICAL FIELD

The present disclosure generally relates to the field of computing and, more particularly, to systems and methods for processing application performance data in computing systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

For modern high-performance workloads such as artificial intelligence, scientific simulation, and graphics processing, measuring application performance is particularly important. These high-performance computing (HPC) applications (also called workloads or jobs) can take many hours, days or even weeks to run, even on state-of-the-art high-performance computing systems with large numbers of processors and massive amounts of memory. Improving performance by five percent can result in a significant time savings when an application runs for weeks. In addition, since many HPC applications are run in public cloud environments charge on a per minute basis, these time savings can translate into significant cost savings as well.

In many cases, these HPC applications are created by domain specialists (e.g. data scientists, physicists, chemists, genetic researchers) that are focused on solving a difficult technical problem (e.g. performing image recognition, modeling a galaxy). They would often prefer to spend their time creating the best model or application to solve their problem, rather than spending time laboriously instrumenting code and then performing manual optimizations, which is a currently a common method for improving the performance of applications.

To improve performance, the developers of an applications typically select one or more performance tools that can be run on the system along with the application in order to log performance data. Examples include Intel VTune or the Linux perf tool (for CPU, memory, I/O and other performance data), ltrace (for tracing system libraries), netstat (for network performance), vmstat (for memory and virtual memory performance monitoring), and iostat (for I/O tracing). A large amount of data can be collected by these and other tools, either alone or in combination. Performance data collected may include for example CPU performance counters, instructions per second counters, cache-miss counters, clock cycle counters, branch miss counters, etc. Once one or more performance monitoring tools are selected, they must be configured (e.g., selecting what data to sample and how often to sample it). The performance data must then be interpreted by the developer in order to figure out what code or system configuration changes should be made.

Collecting all of this performance data can be overwhelming. In many cases, running these traditional performance profiling tools regularly on large HPC jobs is not possible due to the overhead involved. For example, capturing data on 10,000 MPI processes over one week using 100 counters with a one minute interval can produce a large number of data points (e.g., [10,000 procs]×[7 days]×[24 h]×[60 min]×[100 counters] is over 10 billion data items). Even sampling every few hundred clock cycles for a short period of time can generate very large numbers of samples. This can negatively impact performance (i.e., the performance monitoring itself negatively impacts performance because the system must devote significant resources to generating and processing the requested performance data. Even one the data is generated, sorting through it to determine areas for performance enhancement is a difficult task and can require significant time and expertise.

However, since most performance profiling is a statistical sampling process, common wisdom dictates that enough individual samples must be collected to produce statistically meaningful results and to reduce measurement error. So simply reducing the amount of data by increasing the interval or collecting fewer data points would not normally be desirable. For at least these reasons, a better method for processing large quantities of application performance data to enable users to extract value from that data is desired.

SUMMARY

An improved system and method for processing application performance using application phase differentiation is disclosed. While prior methods have enabled general application performance benchmarking, use of application phases enables a higher resolution of data through use of application phases. HPC applications often have different application stages such as preprocessing, processing, and post-processing. These stages (and even different portions within a particular stage) may have dramatically different performance characteristics. For example, the pre-processing portions of an application may be performance bound by I/O (e.g., network bandwidth limiting how fast the application can load the data it will eventually process), while the processing portions may be CPU-bound or GPU-bound (e.g., the bulk of the time the application is waiting for the CPU or GPU to finish calculations on cached data). While these phases might be potentially determinable to the developer when the application is being written by looking at the source code, once the application is built, the computing system executing the application generally has little to no knowledge about these phases.

Detecting these phases may be accomplished in a number of different ways, including by using a deterministic algorithm that looks for changes in the computing resource utilization patterns (as detected in the performance data collected). In the example above, a shift above a predetermined threshold and duration in boundness (e.g., from being network-limited to CPU-limited), may be used to mark a phase change. Similar to detecting characters in a stream of handwriting, a machine learning (ML) algorithm or neural network (e.g. sparse auto encoder SAE) may be used in some embodiments to detect phase changes in the stream of captured performance data.

Using performance data gathered from benchmarks as training data, in an ML implementation it is possible to discriminate between CPU bound, memory-latency bound, memory-bandwidth bound, MPI/network bound, I/O latency bound and I/O bandwidth bound portions of an application (i.e., phases). In these embodiments, a hard threshold may be avoided for specific performance counters or sets of counters. Instead, the ML system will learn how CPU bound phases, memory bound phases, etc. appear in different queues by looking at the performance information of the benchmarks for which the bounding factors are already known.

In one embodiment, the method for processing performance data for an application may comprise configuring performance monitoring and executing the application on a computing system. Performance data for the application may be collected (e.g., in real-time or near-real-time) as the application is executed. For example, this performance information may include performance counters providing information such as CPU-instructions executed, network bandwidth, memory bandwidth, memory latency, etc. The performance data collected may be analyzed as noted above to identify a plurality of application phases for the application, and a relative weight may be calculated for each of the identified application phases. Example applications phases may include one or more of the following types: CPU bound, memory latency bound, memory bandwidth bound, MPI/network bound, I/O latency bound, and I/O bandwidth bound. The performance data collected may be aggregated and weighted for each of the phases and then stored in a database. The aggregated performance data stored in the database may for example comprise the identified application phases and their relative weights.

In some embodiments, the top two or more types of performance limits may be stored for each application phase. For example, an application in the middle of processing data may spend 60% of its time in a particular phase waiting on CPU execution and 35% on GPU execution, so this phase may be stored both of those performance limits. In some other embodiments, an application performance spectrometer may be created and stored for each phase based on the performance counters that are captured during each identified phase.

Beneficially, the performance information stored in the database may be used to find similar applications (from a performance perspective) that have been executed and captured. These similar applications may be used in a number of ways, e.g., to help in predicting application performance on other machines that the application has not been run on (e.g., different bare metal and virtualized computing systems).

In one embodiment, exact timestamps are not used for phases. Instead, relative weightings are calculated and captured based on the number of instructions executed per phase or the time spent in each phase (e.g., the application spent 10% of its time in the first phase, 30% of its time in the second phase, etc.).

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
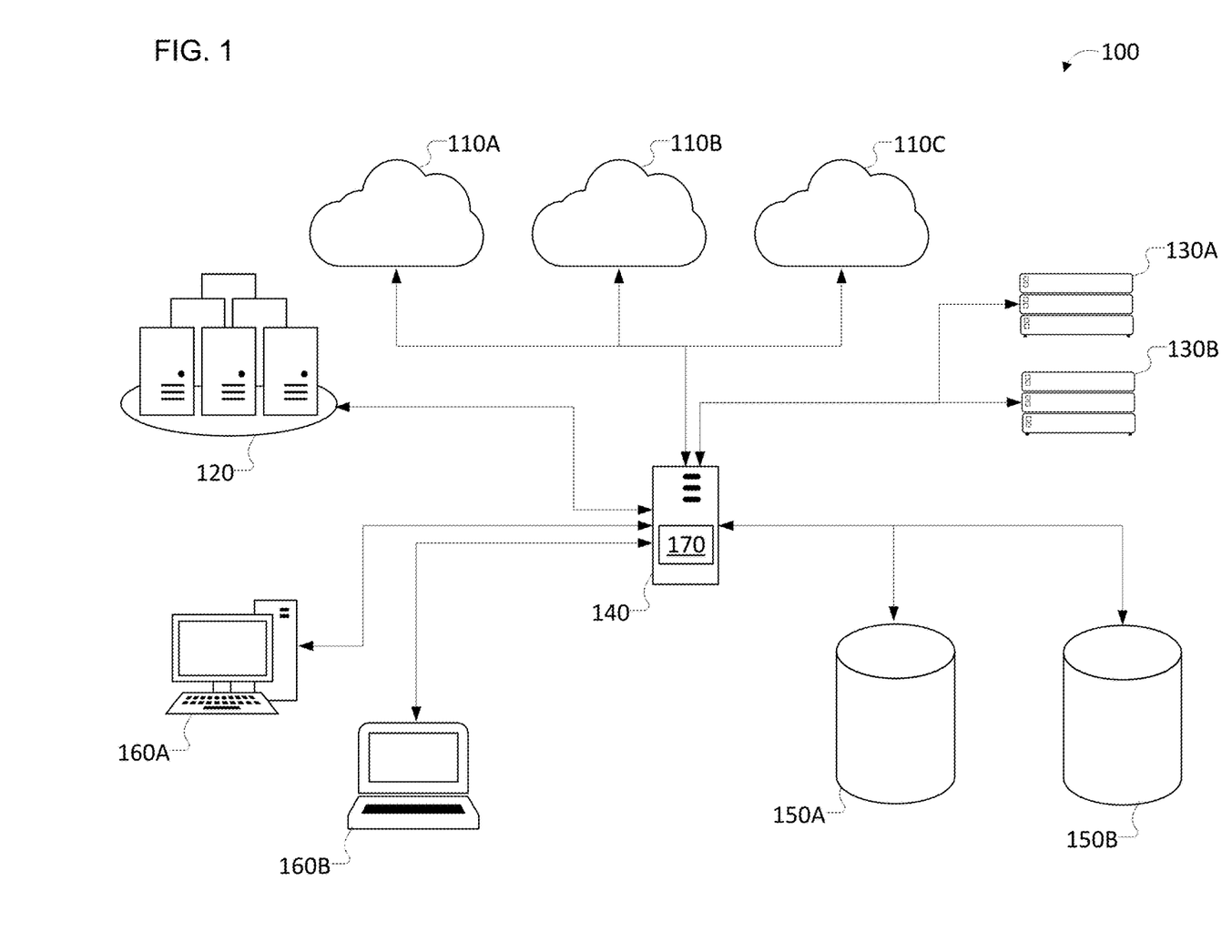
FIG. 1 is an illustration of one example of a distributed computing system.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their user devices 160A and 160B such as on-premises network-connected PCs, workstations, servers, laptops or mobile devices via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with a one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a data center 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute entirely on the management server 140, partly on management server 140 and partly on other computing devices in distributed computing system 100.

The management application 170 provides an interface to users (e.g., via a web application, portal, API server or command line interface) that permits users and administrators to submit applications/jobs via their user devices 160A and 160B, such as workstations, laptops, and mobile devices, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, or one or more nodes within a cluster. Management server 140 may be configured with one or more processors, volatile memory, and non-volatile memory such as flash storage or internal or external hard disk (e.g., network attached storage accessible to management server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be applications operating within containers (e.g. Kubernetes with Docker containers) or virtualized machines.

Unlike prior systems, management application 170 may be configured to provide users with information about the predicted relative performance of different configurations in clouds 110A, 110B and 110C and bare metal systems in data center 120 and systems/devices 130A and 130B. These predictions may be based on information about the specific application the user is planning to execute. In some embodiments the management application 170 may make recommendations for which configurations (e.g., number of processors, amount of memory, amount of storage) best match a known configuration from the user or which bare metal configurations best match a particular cloud configuration.

Figure 2:
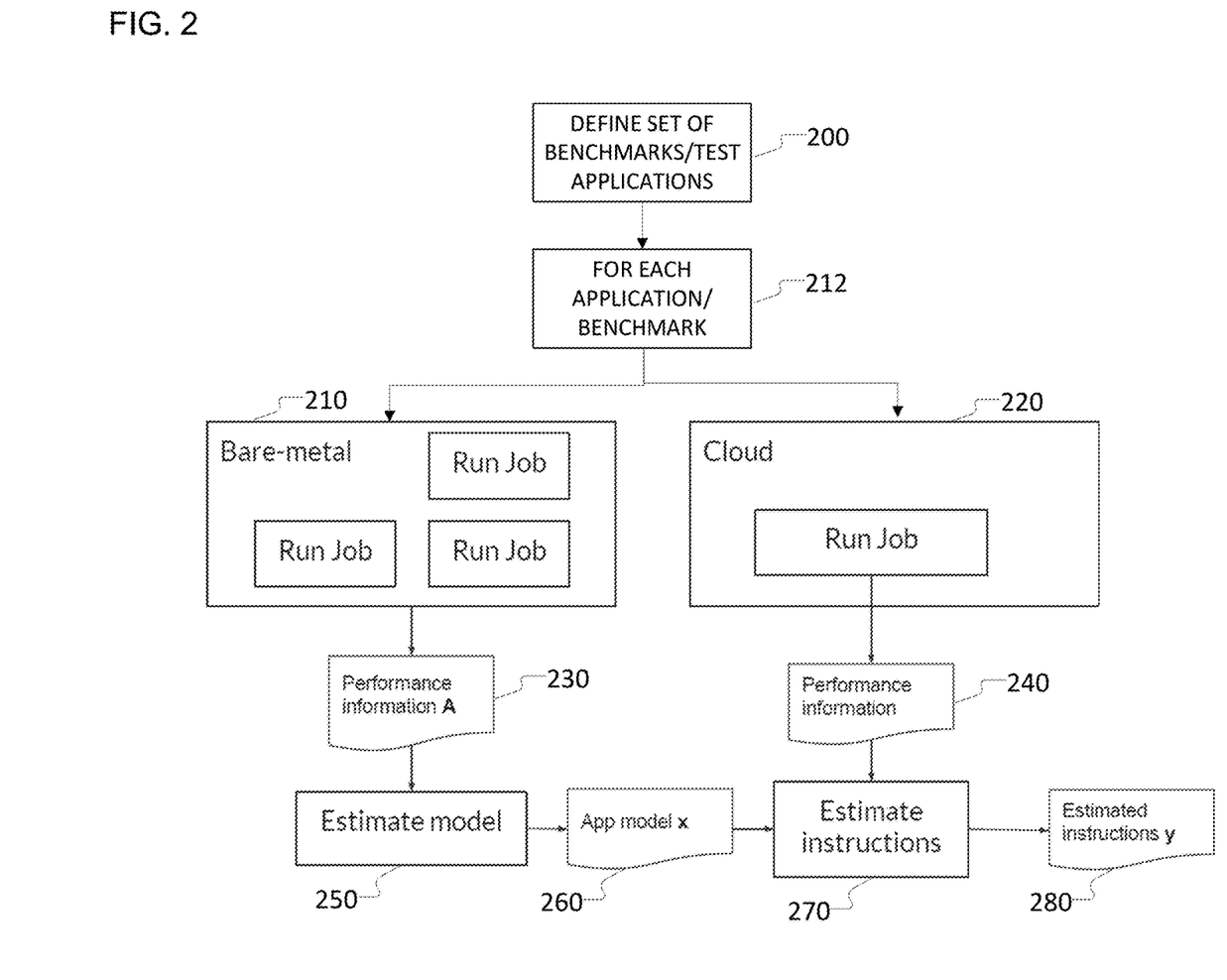
FIG. 2 is a flowchart of an example embodiment of a method for estimating application performance on cloud computing systems.

Turning now to FIG. 2, one example of a method for determining relative performance in cloud computing systems that may be implemented in the management application is shown. As noted above, one of the main metrics for performance estimation is instructions per second. In order to measure instructions per second, one needs to count instruction events in the hardware. Due to security constraints, most of the instance configurations available on cloud services do not allow the user to measure hardware events such as instructions executed, cache-misses, branch-misses, etc. However, there are some other events that are typically available, e.g., task-clock, page-faults, and context-switches. Other performance-related metrics that are also typically available include CPU usage, memory usage, disk usage, and network usage.

Testing has shown that a correlation exists between hardware events such as instructions executed and these other system metrics/events available in the cloud. Based on such correlation, estimations of instructions per second can be determined. For example, machine learning-based methods can be used to estimate performance events from the available system metrics.

In FIG. 2, one example of a method for estimating performance in cloud computing systems is shown. First, a set of benchmarks are defined (step 200). For example, a set of benchmarks might include parsec benchmarks, Tensorflow bird classifier, Graph500, Linpack, and xhpcg. These benchmarks may also include actual user applications. The benchmarks may be single node or multi-node. Each benchmark is then run (step 212), preferably multiple times, on different instance types. This includes bare metal instances (step 210) and non-metal cloud instances (step 220). The total number of runs may be large, as some cloud providers offer more than 200 different instance types including metal instances. For example, each benchmark may be run on a cloud provider on instances having: 2 processors with minimum RAM, 2 processors with maximum RAM, 4 processors with minimum RAM, 4 processors with maximum RAM, 8 processors with minimum RAM, etc. Performance data gathered from these benchmark runs on bare-metal instances (step 230) and cloud instances (step 240) is gathered and used to find one or more correlations between the hardware events and other system metrics or software events that are available on cloud instances. These correlations can be used to create a model (step 250) for each application 260. Then data from runs on cloud instances can be used to train a machine learning system (step 270), which can then be used to estimate hardware counter events 280 for applications on systems where these counter events are not accessible.

The benchmarks may be repeated a number of times (e.g., 5×) to increase the amount of data collected. A Pearson correlation coefficient may be calculated for all counters and system metrics. The counters that are significantly correlated with hardware events (both in general and for particular applications) may then be used to estimate the unavailable performance counter.

In general, only some performance software events are correlated with instructions (e.g., task-clock, page-faults, and context-switches), while others such as cache-misses do not correlate. Some correlations may be application dependent, so having a large number of benchmarks may improve the accuracy of predictions. While the correlations between counters may not be the same for all applications, there are some general patterns.

Based on test data, bare metal to cloud performance may be estimated based on an instructions counter. As noted above, an instructions counter is a useful performance measure available in bare metal systems that indicates how many instructions the processor has executed. Together with time stamps, this yields an instructions per second value that generally results in a good measure of system performance and can be used across systems to compare relative performance. The higher the instructions counter (i.e., the instructions per second), the higher the performance. Since the instructions counter is generally not available in virtualized environment on a cloud, the instructions counter for virtualized cloud environments is predicted based on other counters typically available in those clouds.

To enable this prediction, a set of counters are measured on bare-metal (or metal instances on clouds which are configured to provide access to an instructions performance counter), and the collected data is used to build a machine learning (ML) regression system that estimates the instructions performance measure for other cloud instances (e.g., public clouds) based on a small subset of performance counters available on those cloud instances. Regression is a type of machine learning problem in which a system attempts to infer the value of an unknown variable (Y) from the observation of other variables that are related to the one the system is trying to infer (X). In machine learning regression systems, a sample data set (called a training set) is used. The training set is a set of samples in which the values for both the variable that is trying to be inferred (Y) and those variables that are related to that (X) are known. With the training set, the machine learning system learns a function or model (f) that relates or maps the values from X to Y (e.g., Y=f(X)). Once the function that maps the variables X with Y has been learned, then it is possible to infer the values of the variable Y from the observations of X.

The set of benchmarks used is preferably representative of many different types of applications. For example, in one embodiment multiple benchmarks from the following example list are utilized: Parsec benchmarks (e.g., blackscholes, bodytrack, facesim, freqmine, swaptions, yips, dedup, fluidanimate, x264, canneal, ferret, streamcluster), Tensor flow bird classifier, Linpak, graph500; and xhpcg. Other benchmarks and test applications are also possible and contemplated.

While many tools and techniques may be used to collect the performance data, one example is the perf stat tool, which is able to gather counter values at specified time intervals. The selected set of benchmarks may be executed with the perf stat tool running. Preferably, this is performed in multiple different cloud instances that are to be evaluated. Typically, cloud instances in cloud computing services are arranged by instance type and size (e.g. number of cores). If the instance type is large enough to fill the underlying hardware server (e.g., in AWS these instances are described as "metal"), then the security restrictions that prevent gathering performance counters are relaxed. This makes it possible to gather more performance counters on those instances as opposed to the severely limited set available in shared instances. In building the training set for the system, it is desirable to run the selected set of benchmarks on at least some of the cloud instances that permit access to the larger set of performance counters.

Test data indicates that the instructions performance counter is highly related to other counters that are usually available, e.g., cycles, page-faults, and context-switches. As the relationship between them can be application specific, in one embodiment the system is configured to determine the relationship between the accessible counters and the desired but inaccessible instruction counter on a per benchmark (i.e., per application) basis. These measured relationships can then be used to predict the instructions counter on shared instances in public cloud systems where the instructions counter is not available.

While in some embodiments benchmarks may be combined to provide overall system-level relative performance rankings, for application-specific recommendations it may be preferable to model each benchmark separately, e.g., for each of the benchmarks a different x vector is calculated to model the relationship between the available counters and the unavailable but desirable instructions counter. To predict the instructions counter on a cloud with limited access to performance counters, the application for which the estimate is being performed is matched to one of the available benchmarks having been previously run. The learned model from that benchmark is then used to predict an estimated instruction counter (e.g. as y=Ax). In order to match applications, it is preferable to conduct at least one run with all performance counters available for that application. From that run, a normalized histogram of performance counters can be created. The normalized histograms may be computed from the quotient of different counters and may be normalized, such that concatenating all the histograms for a given application/benchmark provides a feature vector (i.e., a performance counters spectral signature) that can be used to perform application matching.

Figure 3:
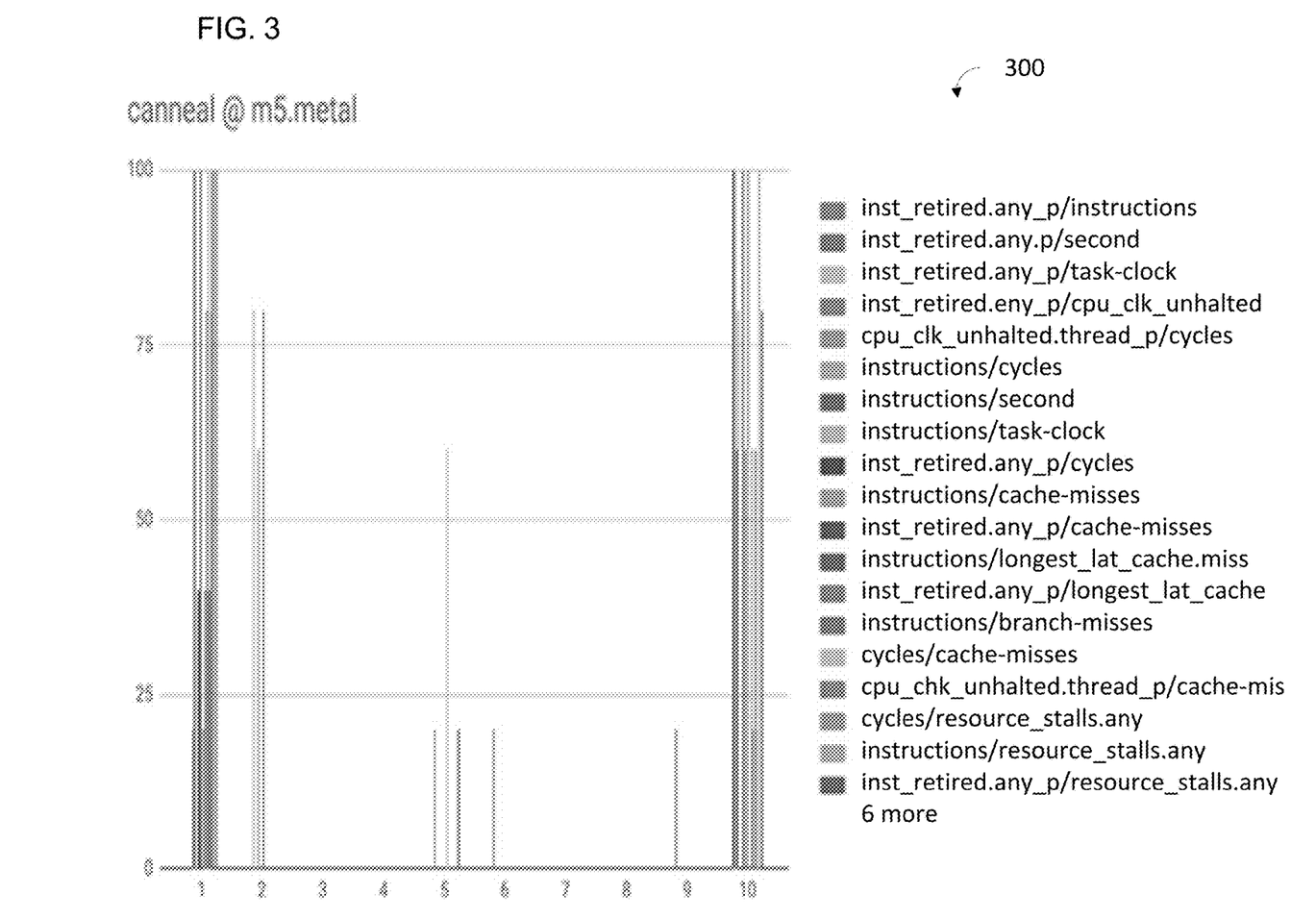
FIG. 3 is an illustration of an example spectrometer of performance data.

One such example performance spectrometer 300 is shown in FIG. 3, which is based on test data for the canneal benchmark on a full server "metal" cloud instance. These performance spectrometer histograms may be used in matching a user's application to one of the tested benchmarks. To perform the application to benchmark matching, in one embodiment a metric to measure differences (e.g., distances) between applications may be used (e.g. least squares), and the benchmark closest to the user's application may be used.

Figure 4:
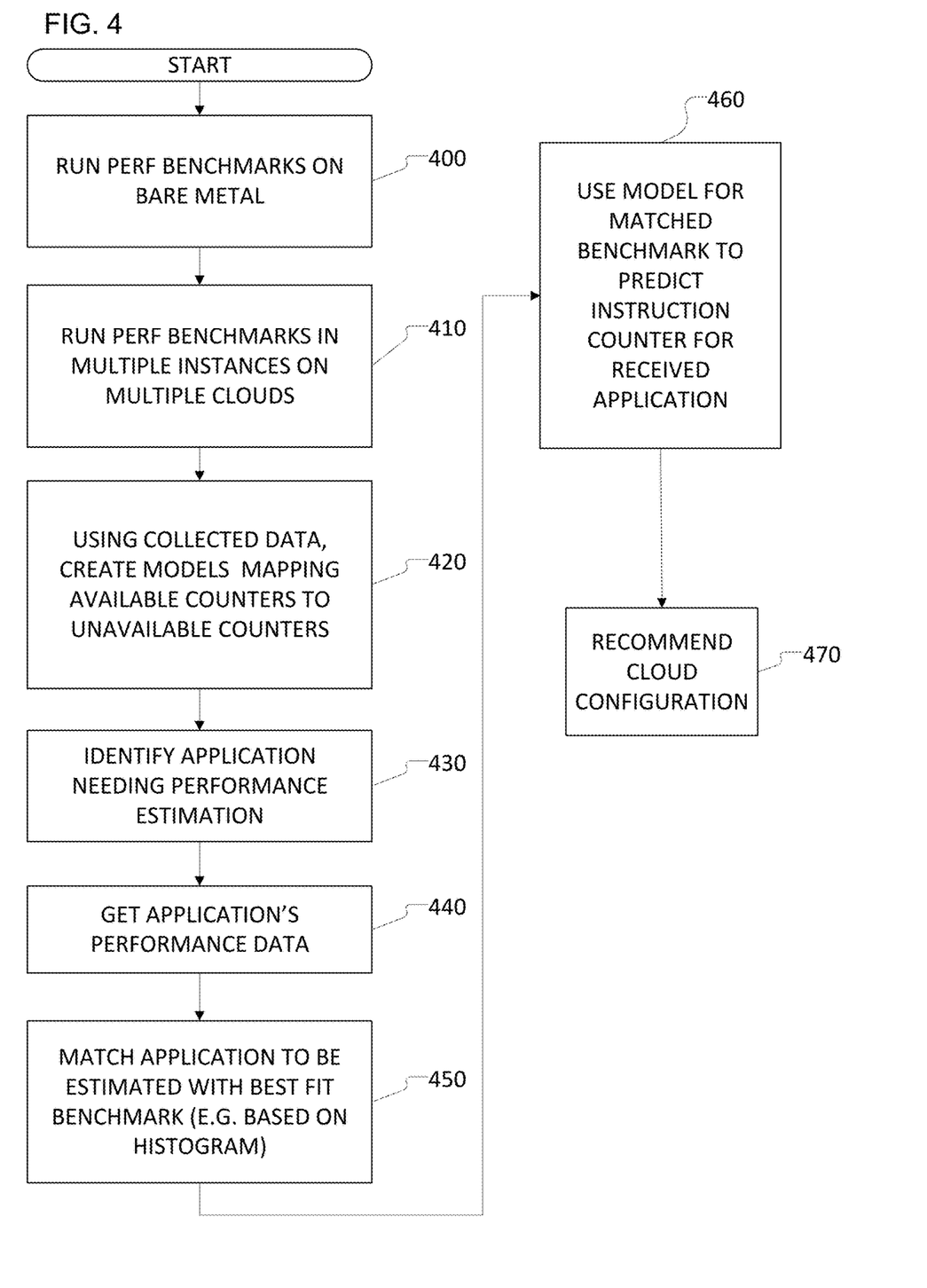
FIG. 4 is a flowchart of an example embodiment of a method for recommending a cloud configuration based on estimated performance counters.

Turning now to FIG. 4, a flowchart of an example embodiment of a method for recommending a cloud configuration based on estimated performance counters is shown. In this embodiment, benchmarks are run on bare metal systems (step 400) and on multiple cloud instances on multiple different clouds (step 410). Data is collected and used to create models that map available counters on cloud systems to the desired but unavailable performance counters such as the instructions counter (step 420). When a user specifies an application that they have previously run on bare metal and want to run on the cloud (step 430), the user is prompted for performance data the user has observed on the bare metal run (step 440). For example, the user may specify what the perf tool measured as instructions per second when they ran their application on their local development workstation on a test data set. The application may also be matched to one of the existing benchmarks that have been run (step 450). This matching may be based on application histograms, the libraries used by the application, the data sets used by the application, or other application-specific data or metadata. The model created earlier for the matching benchmark is then used to predict cloud performance counters for the application (step 460), and a recommendation is made (step 470). The recommendation may be for the fastest performance (e.g., within a given budget specified by the user), or for a best match to their current bare metal system's performance.

Figure 5:
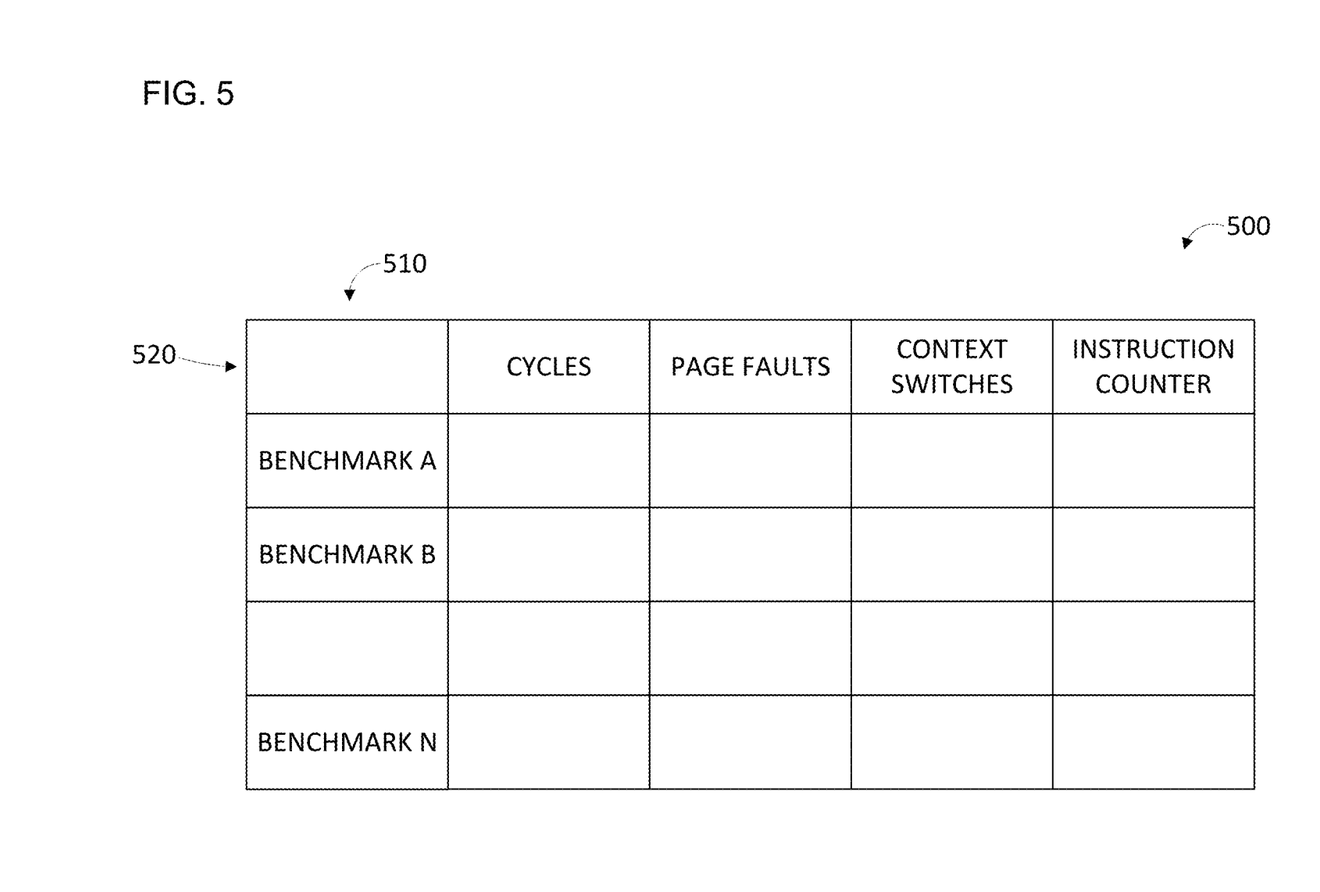
FIG. 5 is a diagram illustrating an example of a matrix usable for estimating performance for cloud and bare metal systems.

Turning now to FIG. 5, a diagram illustrating an example matrix 500 usable for estimating performance for cloud and bare metal systems is shown. While other matrix configurations are possible and contemplated, in this example, each row stores data for a different benchmark (or different run if multiple runs per benchmark are available), as indicated by column 510. Each column stores the values gathered for a particular counter, as indicated by row 520. In some embodiments, not all systems may be tested, but based on the existing data for similar tested instance configurations, predictions may still be made.

Figure 6:
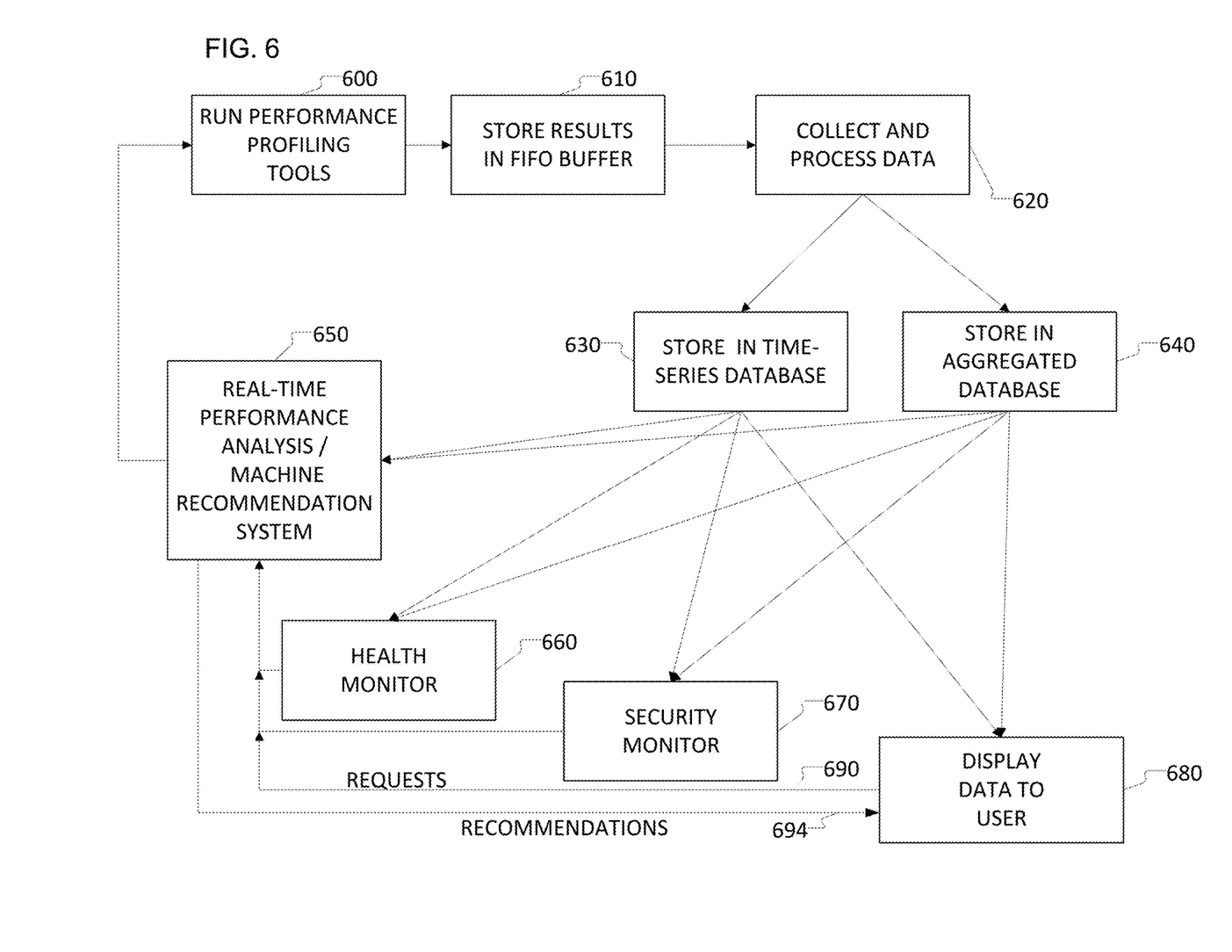
FIG. 6 is a flowchart illustrating an example of one embodiment of a method for collecting performance data in a high-performance computing system.
Figure 7:
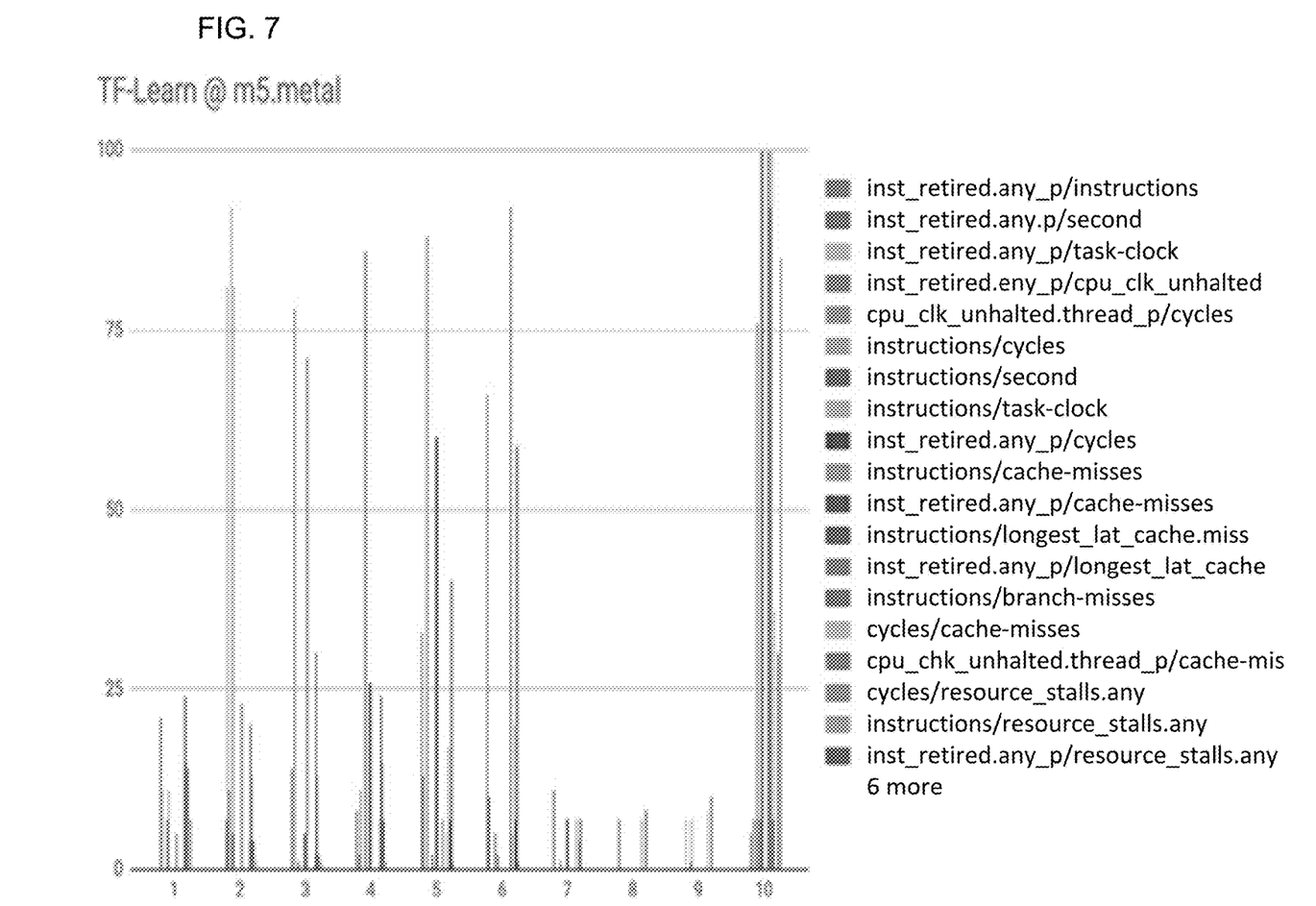
FIG. 7 is yet another example illustration of a spectrometer of performance data.

Turning now to FIG. 6, a flowchart illustrating one example embodiment of a scalable and low overhead method for collecting performance data is shown. This method may be configured to work with custom developed performance profiling tools and with existing off-the-shelf performance tools like Linux perf. This is because this method does not require special modification of the tools used.

One or more performance profiling tools (e.g., Linux perf tool) are launched in connection with running an application or benchmark (step 600). As results are generated, they are temporarily stored in a FIFO (first-in first-out) buffer (step 610). When the data from the profiling tool arrives, it is removed from the FIFO buffer by the data collection processor and is processed (step 620). This processing may include for example formatting the data so it can be stored in a time series database (step 630) and aggregating the data so it can be stored in an aggregated database (step 640). For example, for each job all collected samples may be aggregated (e.g., combined via time-weighted averaging based on application phases such data fetching, pre-processing, processing, post-processing) and stored in the aggregated database. In some embodiments a machine learning algorithm may be used to learn to aggregate (e.g., a cascade-correlation approach). When there is no correlation between performance data samples, a simple neural network can be used that will learn the aggregate functions (e.g. using some standard TensorFlow functions).

The newest information may also be saved in an unaggregated format for real time performance analysis in the time-series database. Access to the databases may be provided to user (step 680). For example, on occasion the user may which to invoke an expert mode to see the performance data directly. The user may also provide requests 690 to the real-time performance analysis engine (e.g., to increase resolution or add a particular performance counter of interest for a particular application). However, the real-time performance analysis engine and machine recommendation system 650 may also provide recommendations 694 back to the user regarding optimizations that the user may want to consider for either their application (e.g., which library to use) or the configuration for the computing system (e.g., the amount of memory allocated).

Real-time performance analysis engine and machine recommendation system 650 may be configured to use machine learning (ML) to process the data in the time series and aggregated databases to generate the recommendations 694. For example, MapReduce or Spark may be used to compute a covariance matrix based on the performance data captured. Other modules such as a system health monitor 660 and system security monitor 670 may also be configured to access the time series and aggregated databases and send requests to the real-time performance analysis engine and machine recommendation system 650 for additional data. For example, if system security monitor 670 detects a potential threat, it may request certain performance data at a high frequency in order to better determine if the threat is real. Similarly, if system health monitor 660 detects a possible system health issue, it may request additional performance data (e.g., certain counters to be recorded at a certain interval or frequency).

Since the newest information may be kept at a high frequency sampling rate, the user has the ability to check the job performance on a real time basis using both aggregated information (i.e., based on the whole job execution aggregated up to a current point in time) and also the high frequency sampling of the most recent period (e.g., the last few minutes). The time-series database may be configured to contain only a small window (e.g., the last few minutes) of the job execution or it may be configured to contain a larger window, up to one that includes all the samples collected. However, the last option can be very expensive in terms of storage and queries for the job statistics from the time-series database. Preferably, the window of the high frequency data is set to be small enough to not impact the job execution. Although the amount of data required to store all the profiling data may be large, it is produced at a low pace. For the example presented above, all the 10,000 MPI processes will produce only ~800 KB per second (e.g. [10,000 procs]×[100 counters]×[50 bytes per counter]/[60 seconds]~800 KB/s).

Data from the two databases may be displayed directly to the user (step 680) interactively or passively, and the data may also be used by real-time performance analysis engine and machine recommendation system 650 for performing real-time performance analysis and for making recommendations as described above. For example, if the application is determined to be repeatedly waiting for data access from storage, a recommendation to change the system configuration to one with more system memory may be made.

Advantageously, real-time performance analysis engine and machine recommendation system 650 can measure the impact of performance monitoring and apply policies. For example, one policy may be to not allow performance monitoring to have more than X % impact on application performance for normal priority applications, and do not permit more than Y % impact for applications identified as high priority. To prevent a greater impact, the polling interval may be throttled. Real-time performance analysis engine and machine recommendation system 650 may use machine learning-guided algorithms to determine when to collect more or less performance data and may intermediate between requests for data from a user, and security and health monitors.

Turning back to FIG. 3, an illustration of an example spectrometer of performance data is shown. This example is for the for Canneal app, which is memory-latency-bound. Canneal has a high concentration of low values (bars on the leftmost side on bin 1) for these metrics: instructions/second, instructions/task-clock, instructions/cache-misses, instructions/longest_lat_cache.miss, instructions/branch-misses, instructions/resource_stalls.any, instructions/page-faults, task-clock/page-faults, task-clock/second.

This example chart uses metrics from hardware counters, but other types of performance data may also be used. The collected performance data is normalized, scaled, and quantized so that a high value of a metric means better performance. As an example, a high value of cycles/cache-misses leads to more expected performance, but the opposite is true of a high value of cache-misses/cycles leads to expected performance loss. So the metric is normalized and scaled to be cycles/cache-misses instead of cache-misses/cycles.

The spectrometer charts may comprise the histogram of multiple metrics. The metrics are scaled and normalized to be directly proportional to expected performance. So a high concentration of bars on the right side of the chart means more expected performance, and a high concentration of bars on the left side of the chart means less expected performance. For example, a 100% on the leftmost position means that this metric was the low for all (100%) collected samples.

This has several benefits for the user, including for example (i) easily identifying if an application is CPU-bound or memory-bound, (ii) easily identify if the app is taking advantage of the CPU (more values on the right) or not taking advantage of the CPU (more values on the left), and (iii) easily being able to fine tune with metrics such as stalls, cache-misses, branch-misses, etc.

Figure 8:
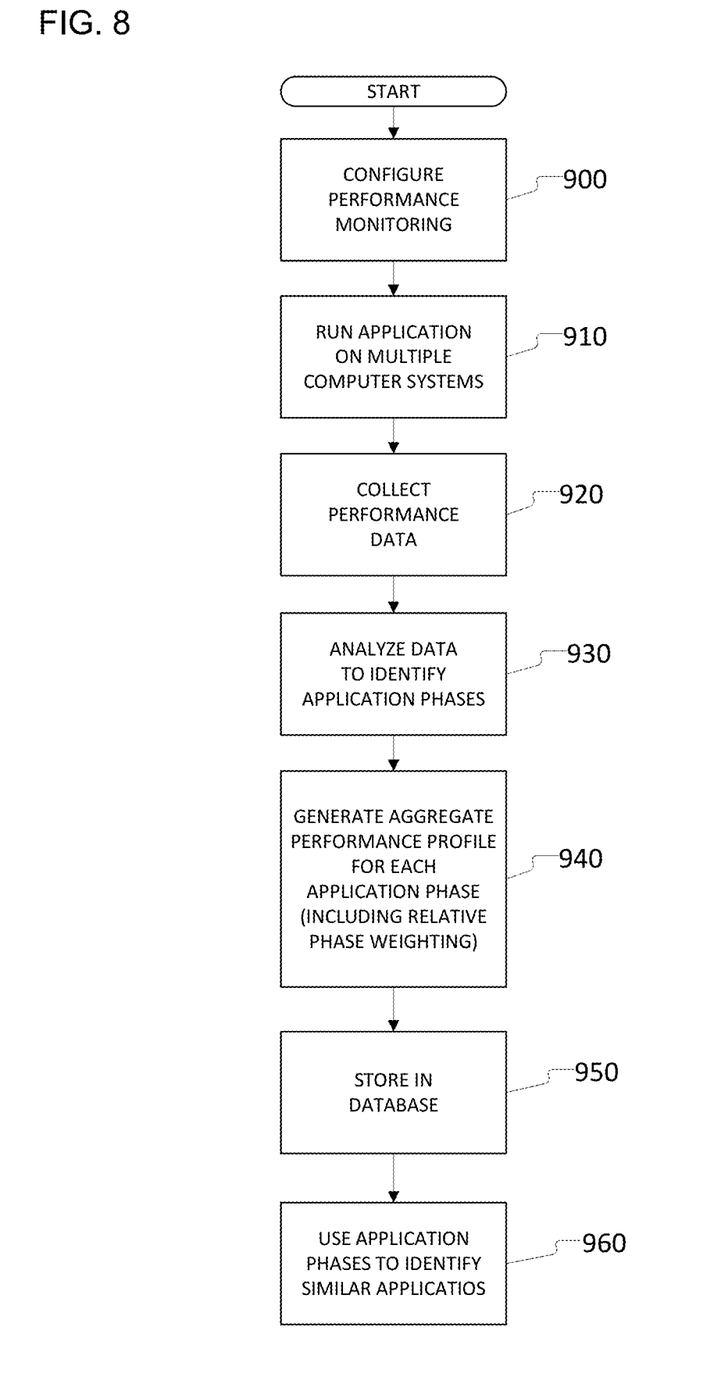
FIG. 8 is a flowchart illustrating an example of one embodiment of a method for processing performance data.

Turning now to FIG. 8, yet another example illustration of a spectrometer of performance data is shown. In this example, the application being profiled is TF-Learn, which is CPU-bound. TF-Learn has a high concentration (100%) of high values (bars on the rightmost side on bins 9-10) for these metrics: task-clock/second, instructions/cache-misses, inst_retired.any_p/cache-misses, cycles/cache-misses, cpu_clk_unhalted.thread_p/cache-misses, cycles/resource_stalls.any, instructions/resource_stalls.any.

Turning now to FIG. 8, a flowchart illustrating one embodiment of a method for processing performance data is shown. In this embodiment, performance data monitoring is configured (step 900). This may for example, include configuring performance data collection tools such as the Linux perf tool (for CPU, memory, I/O and other performance data), ltrace (for tracing system libraries), netstat (for network performance), vmstat (for memory and virtual memory performance monitoring), and iostat (for I/O tracing). One or more of these tools may be configured on one or more different computer systems upon which an application being profiled will be tested (step 910). The performance data from the application's run is collected (step 920), and it is analyzed to detect application phases (step 930). Detecting these phases may be accomplished in a number of different ways, including by using a deterministic algorithm that looks for changes in the computing resource utilization patterns (as detected in the performance data collected). For example, the algorithm may detect when the application shifts from being bound by one performance factor to another for more than a predetermined number of samples or time period (hysteresis may be applied). These shifts above a predetermined threshold and duration in boundness (e.g., from being network-limited to CPU-limited), may be used to mark phase changes. Similar to detecting characters in a stream of handwriting, a machine learning (ML) algorithm or neural network (e.g. sparse auto encoder SAE) may be used in some embodiments to detect phase changes in the stream of captured performance data.

These classifications of which performance bounded-state (e.g. CPU-bound, I/O-bound, memory bandwidth bound) the application is in may then be relatively time-weighted to generate an aggregated performance profile of the application (step 940). For example, if the application had the following sequence of phases: 5 ms I/O bound, 40 ms CPU bound, 10 ms I/O bound, 10 ms memory bandwidth bound, 20 ms CPU bound, 15 ms I/O bound), then aggregated weighted performance profile for the application may be: 60% CPU bound, 30% I/O bound, 10% memory bandwidth bound. The aggregated (and optionally weighted) performance data may then be stored in an application performance characterization database (step 950) with prior collected aggregated performance data from other applications. In some embodiments, the aggregated data stored may include alternate or additional data such as a performance spectrogram (e.g., for the entire application run, or one spectrogram for each identified phase), execution time, cost information, system configuration information for previous application runs.

The database may be used to collect performance data for many applications across many different platforms (both bare metal and cloud) from different vendors. This database may beneficially collect vast amounts of application performance data across multiple different platforms and multiple platform configurations (e.g. different virtual instances on cloud systems with different CPU/GPU/memory configurations). This data may be used to find similar applications (step 960) and make performance predictions (e.g. to provided estimated relative execution times/costs when a new application is first encountered).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for processing application performance data, the method comprising:
    (i) collecting, via a processor of a computational device, performance data for an application executing on a computing system;
    (ii) analyzing the performance data via the processor of the computational device to identify a plurality of application phases for the application;
    (iii) determining a relative weight for each of the identified application phases via the processor of the computational device;
    (iv) storing aggregated performance data for the application in a database via the processor of the computational device, wherein the aggregated performance data comprises the identified application phases and their relative weights; and
    (v) searching the database via the processor of the computational device to identify similar applications based on the stored aggregated performance data.

2. The method of claim 1, wherein (ii) further comprises identifying and storing a most performance limiting process type for each of the identified application phases.

3. The method of claim 1, wherein the identified application phases are selected from the group comprising: CPU-bound, network-bound, and I/O-bound.

4. The method of claim 1, further comprises identifying and storing a plurality of the most performance limiting process types for each of the identified application phases.

5. The method of claim 1, further comprising repeating (i)-(vi) for a plurality of different computing systems.

6. The method of claim 5, wherein the plurality of different computing systems comprise bare metal and virtualized cloud instances.

7. The method of claim 1, wherein the aggregated performance data comprises a performance spectrometer for each phase.

8. The method of claim 1, wherein (ii) is performed by applying a deterministic algorithm.

9. The method of claim 1, wherein (ii) is performed by applying a machine learning algorithm.

10. The method of claim 1, wherein (ii) is performed by a sparse auto encoder (SAE) neural network.

11. The method of claim 1, further comprising configuring performance monitoring on the computer system.

12. The method of claim 1, wherein the database includes an application performance characterization database with prior collected aggregated performance data from other applications, and wherein the similar applications include similar performance data of application phases for the other applications.

13. The method of claim 1, wherein:
    the collected performance data includes a plurality of performance counters; and
    the plurality of performance counters includes at least one of:
        CPU performance counters;
        instructions per second counters;
        cache-miss counters;
        clock cycle counters; and
        branch miss counters.

14. A non-transitory, computer-readable storage medium storing instructions executable by a processor of a computational device, which when executed cause the computational device to:
    (i) collect performance data for an application executing on a computing system;
    (ii) analyze the performance data to identify a plurality of application phases for the application;
    (iii) determine a relative weight for each of the identified application phases;
    (iv) store aggregated performance data for the application in a database, wherein the aggregated performance data comprises the identified application phases and their relative weights; and
    (v) search the database to identify similar applications based on the stored aggregated performance data.

15. The non-transitory, computer-readable storage medium of claim 14, wherein the instructions, when executed via the processor of the computational device, further cause the computational device to identify and store a most performance limiting process type for each of the identified application phases.

16. The non-transitory, computer-readable storage medium of claim 14, wherein the identified application phases are selected from the group comprising: CPU-bound, network-bound, and I/O-bound.

17. The non-transitory, computer-readable storage medium of claim 14, wherein the instructions, when executed via the processor of the computational device, further cause the computational device to repeat (i)-(vi) for a plurality of different computing systems.

18. The non-transitory, computer-readable storage medium of claim 14, wherein the database includes an application performance characterization database with prior collected aggregated performance data from other applications, and wherein the similar applications include similar performance data of application phases for the other applications.

19. A method for processing application performance data, the method comprising:
(i) collecting, via a processor of a computational device, performance data for an application executing on a computing system;
(ii) analyzing the performance data via the processor of the computational device to identify a plurality of application phases for the application;
(iii) determining a relative weight for each of the identified application phases via the processor of the computational device;
(iv) storing aggregated performance data for the application in a database via the processor of the computational device, wherein the aggregated performance data comprises the identified application phases and their relative weights; and
(v) searching the database via the processor of the computational device to identify another application based on the stored aggregated performance data.

20. The method of claim 19, wherein the other application includes a similar application to the application executed on the computing system.

21. The method of claim 20, wherein the similar application is identified using the application phases of prior collected aggregated performance data from other applications that have been executed and captured in the database.

22. The method of claim 19, wherein the plurality of application phases includes one or more of: CPU bound, memory latency bound, memory bandwidth bound, MPI/network bound, I/O latency bound, and I/O bandwidth bound.

* * * * *